United States Patent
Combest

(10) Patent No.: US 8,240,758 B2
(45) Date of Patent: Aug. 14, 2012

(54) DEFORMABLE SEAT PAN FOR A TILTABLE VEHICLE SEAT

(75) Inventor: John Combest, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 948 days.

(21) Appl. No.: 11/389,539

(22) Filed: Mar. 27, 2006

(65) Prior Publication Data

US 2007/0222270 A1    Sep. 27, 2007

(51) Int. Cl.
*B60N 2/42* (2006.01)
(52) U.S. Cl. ............ 297/216.16; 297/216.1; 297/216.19
(58) Field of Classification Search ............... 297/216.1, 297/216.16, 219.19
See application file for complete search history.

(56) References Cited

U.S. PATENT DOCUMENTS

| | | |
|---|---|---|
| 3,357,736 A | 12/1967 | McCarthy |
| 4,650,249 A | 3/1987 | Serber |
| 5,022,707 A | 6/1991 | Beauvais et al. |
| 5,112,109 A | 5/1992 | Takada et al. |
| 5,244,252 A | 9/1993 | Serber |
| 5,460,427 A | 10/1995 | Serber |
| 5,558,399 A | 9/1996 | Serber |
| 5,735,574 A | 4/1998 | Serber |
| 5,961,073 A | 10/1999 | Wittman |
| 6,030,043 A | 2/2000 | Habedank |
| 6,106,065 A | 8/2000 | Carroll |
| 6,176,543 B1 | 1/2001 | Nawata et al. |
| 6,334,648 B1 | 1/2002 | Girsberger et al. |
| 6,386,631 B1 | 5/2002 | Masuda et al. |
| 6,402,237 B1 * | 6/2002 | Adomeit et al. ........... 297/216.1 |
| 6,406,092 B1 | 6/2002 | Cordes et al. |
| 6,557,935 B2 | 5/2003 | Choi |
| 6,641,214 B2 | 11/2003 | Veneruso |
| 6,682,141 B2 | 1/2004 | Reynold et al. |
| 6,752,454 B2 * | 6/2004 | Ruel et al. .................. 297/216.1 |
| 6,755,469 B2 | 6/2004 | Akaike et al. |
| 6,773,075 B2 * | 8/2004 | Rouhana et al. .............. 297/484 |
| 6,913,319 B2 | 7/2005 | Yamaguchi et al. |
| 2002/0024242 A1 * | 2/2002 | Becker et al. .............. 297/216.1 |
| 2003/0034679 A1 | 2/2003 | Choi |
| 2003/0230918 A1 | 12/2003 | Serber |
| 2005/0242634 A1 | 11/2005 | Serber |
| 2006/0055214 A1 | 3/2006 | Serber |
| 2006/0119149 A1 * | 6/2006 | Yoshikawa et al. ........ 297/216.1 |

FOREIGN PATENT DOCUMENTS

| | | |
|---|---|---|
| BE | 537159 | 4/1955 |
| HK | 1012313 B | 7/1999 |
| JP | 3179482 B | 3/1994 |

OTHER PUBLICATIONS

SAE technical paper, Series 1999-01-0632 "Counter Balanced Motion (CBM)-Dynamic Seating", by Hector Serber.
SAE technical paper, Series 2003-01-0498 "Test Results of the (CBM) Seat Crash Worthiness" by Hector Serber.

* cited by examiner

Primary Examiner — Sarah B McPartlin
(74) Attorney, Agent, or Firm — Global IP Counselors, LLP

(57) ABSTRACT

A tiltable vehicle seat has a tiltable metallic seat pan that tilts upon rapid vehicle deceleration. The metallic seat pan is supported for movement between a normal seating position and a tilted or deployed position. The seat pan includes a deformable anti-submarining beam that extends laterally across the seat pan. The deformable anti-submarining beam is deformable in response to a prescribed deformation force exerted from the general direction of a buttocks supporting end thereof with the seat pan in the deployed position.

21 Claims, 12 Drawing Sheets

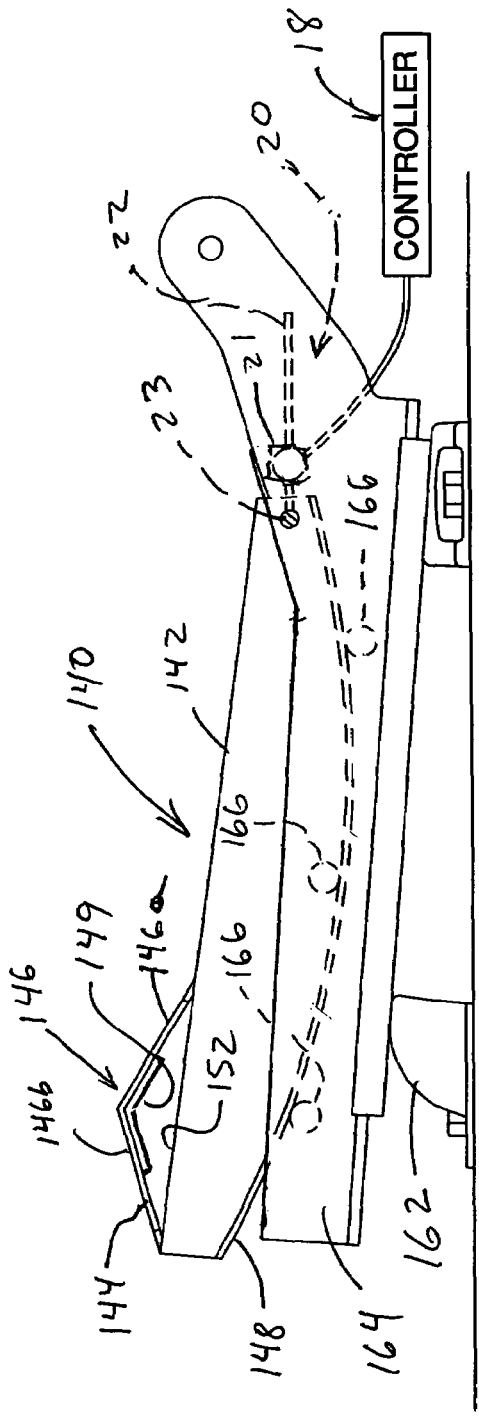
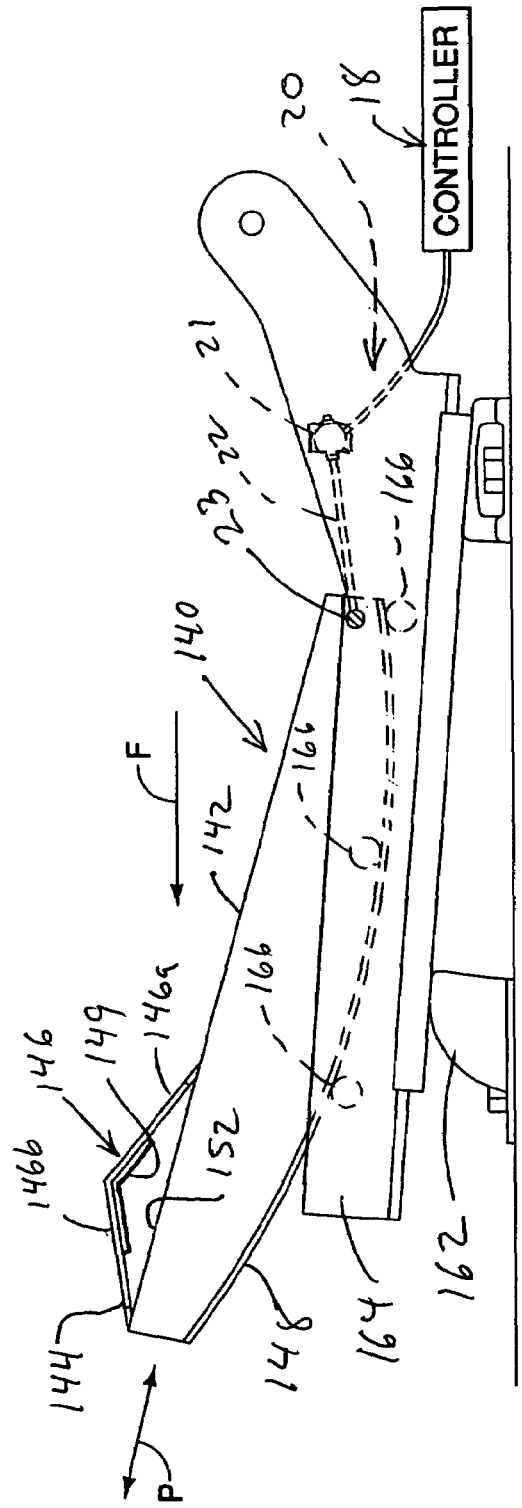

DEFORMABLE SEAT PAN FOR A TILTABLE VEHICLE SEAT

CROSS-REFERENCE TO RELATED APPLICATIONS

Background of the Invention

1. Field of the Invention

The present invention generally relates to a tiltable vehicle seat that tilts upon rapid vehicle deceleration. More specifically, the present invention relates to a tiltable vehicle seat having a rigid seat pan with a deformable anti-submarining portion that absorbs energy in response to a prescribed deformation force exerted by an occupant's buttocks.

2. Background Information

Normally, a vehicle seat is rigidly mounted to a vehicle body, and provided with passive restraints such as a seat (lap) belt and a shoulder strap. When a rapid vehicle deceleration occurs with a belted occupant in a normal (non-tiltable) seat, the seat belt acts to restrain the pelvis from forward movement and the shoulder strap restrains the upper torso. In the case of a rapid vehicle deceleration with an unbelted occupant in a normal (non-tiltable) seat, the steering wheel and/or airbag act to restrain the upper torso of the occupant, while restraint of the pelvis of the occupant is delayed until the lower extremities of the occupant contact the knee bolster. As a result, in the rapid vehicle deceleration, the forces in the occupant's vertebrae are typical much higher in shear than in compression due to the occupant's position and restraint forces acting on the occupant.

In some vehicle an anti-submarining device is provided to prevent an occupant in a vehicle seat from slipping forward underneath the occupant's seat belt during rapid vehicle deceleration. One example of an anti-submarining device used in a vehicle seat is disclosed in U.S. Pat. No. 6,908,149. Recently, various tiltable seats have been developed to change the occupant's position to reduce the shear on the occupant from the restraint forces acting on the occupant. In these tiltable seats, a front portion of the tiltable seat will typically move upward during rapid vehicle deceleration relative to its normal rest position. One example of a tiltable seat is known as a counter balanced motion (CBM) seat. Such CBM seats are disclosed in U.S. Pat. Nos. 4,650,249; 5,244,252; 5,460,427; 5,558,399 and 5,735,574. A more recent version of the CBM seat is disclosed in U.S. Patent Publication No. 2005/0242634 in which the CBM seat is provided with an anti-submarining device.

The tiltable seats are designed to control the position of the occupant in the seat to improve occupant protection during rapid vehicle deceleration, such as a frontal vehicular impact. In particular, movement of the tiltable seat causes a repositioning the occupant in the tiltable seat in order to affect the way the occupant interacts with the interior design features including the seat. Specifically, during rapid vehicle deceleration, the pelvis of the occupant of a tiltable seat is shifted with the femurs moving upward but with the buttocks supporting portion of the tiltable seat remaining at approximately the same level. Such movement protects the occupant from impact with features within the vehicle, such as the dashboard, and reduces the shear forces on the vertebrae that the seat belt can cause. However, during rapid vehicle deceleration, the pelvis and thighs of an occupant in a tiltable seat will be pressed against the rigid seat pan of the seat such that a force or load is imparted on the occupant from the seat pan due to the tilted position of the seat. Therefore, it is desirable to have a seat pan that can absorb some of the forward movement forces to further protect the occupant of the tiltable seat.

In view of the above, it will be apparent to those skilled in the art from this disclosure that there exists a need for an improved seat pan for a tiltable seat to further protect an occupant of the tiltable seat upon rapid vehicle deceleration. This invention addresses this need in the art as well as other needs, which will become apparent to those skilled in the art from this disclosure.

SUMMARY OF THE INVENTION

It has been discovered that to improve the safety and comfort features of a tiltable seat, it is desirable to provide a seat pan of the tiltable seat with energy absorbing properties.

In accordance with one aspect of the present invention, a metallic seat pan is provided that includes a rear buttocks supporting portion and a front femoral supporting portion. The front femoral supporting portion includes a deformable anti-submarining beam that extends laterally across the front femoral supporting portion. The deformable anti-submarining beam is configured and arranged relative to the rear buttocks supporting portion to restrict movement of an occupant's buttocks in a longitudinal direction from the rear buttocks supporting portion towards the front femoral supporting portion. The deformable anti-submarining beam has a prescribed rigidity that resists deformation. The prescribed rigidity is set to a prescribed deformation limit that reduces spinal compression of an occupant by deforming when the occupant's buttocks applies a deformation force in the longitudinal direction that exceeds the prescribed deformation limit.

In accordance with another aspect of the present invention, a tiltable seat includes a stationary seat mounting structure, an occupant seating structure and a seat pan tilting mechanism. The occupant seating structure is attached to the stationary seat mounting structure. The occupant seating structure includes a metallic seat pan having a rear buttocks supporting portion and a front femoral supporting portion with a deformable anti-submarining beam extending laterally across the front femoral supporting portion. The deformable anti-submarining beam is configured and arranged relative to the rear buttocks supporting portion to restrict movement of an occupant's buttocks in a longitudinal direction from the rear buttocks supporting portion towards the front femoral supporting portion. The deformable anti-submarining beam has a prescribed rigidity that resists deformation. The prescribed rigidity is set to a prescribed deformation limit that reduces spinal compression of an occupant by deforming when the occupant's buttocks applies a deformation force in the longitudinal direction that exceeds the prescribed deformation limit. The seat pan tilting mechanism is configured and arranged to selectively tilt the front femoral supporting portion upwardly relative to the rear buttocks supporting portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 14 is a simplified diagram of the seat pan installed in a counter balanced motion seat in accordance with the second embodiment of the present invention, with the seat pan in a normal seating position; and FIG. 15 is another simplified diagram, similar to FIG. 14, of the seat pan in accordance with the second embodiment of the present, with the seat pan in a deployed or tilted position in response to rapid vehicle deceleration.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
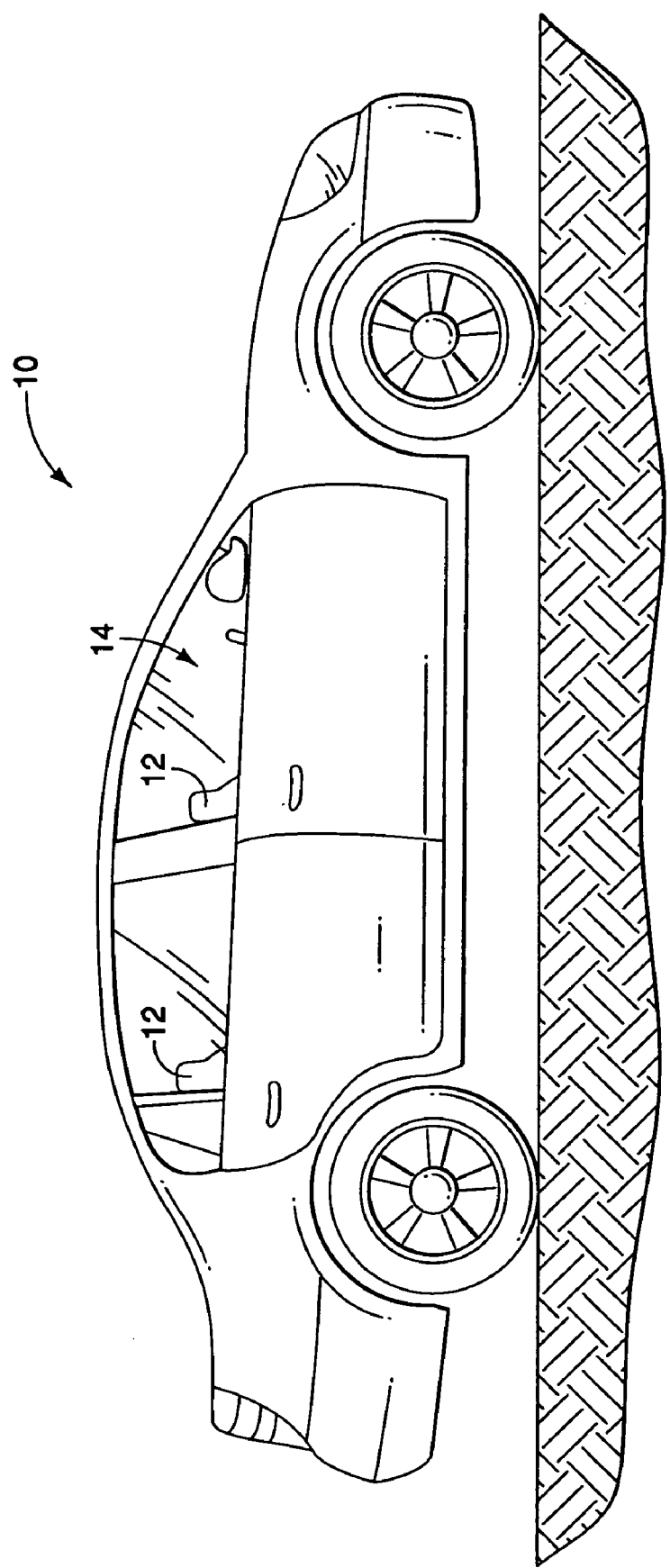
FIG. 1 is a side elevational view of a vehicle that includes at least one tiltable seat in accordance with the present invention.
Figure 2:
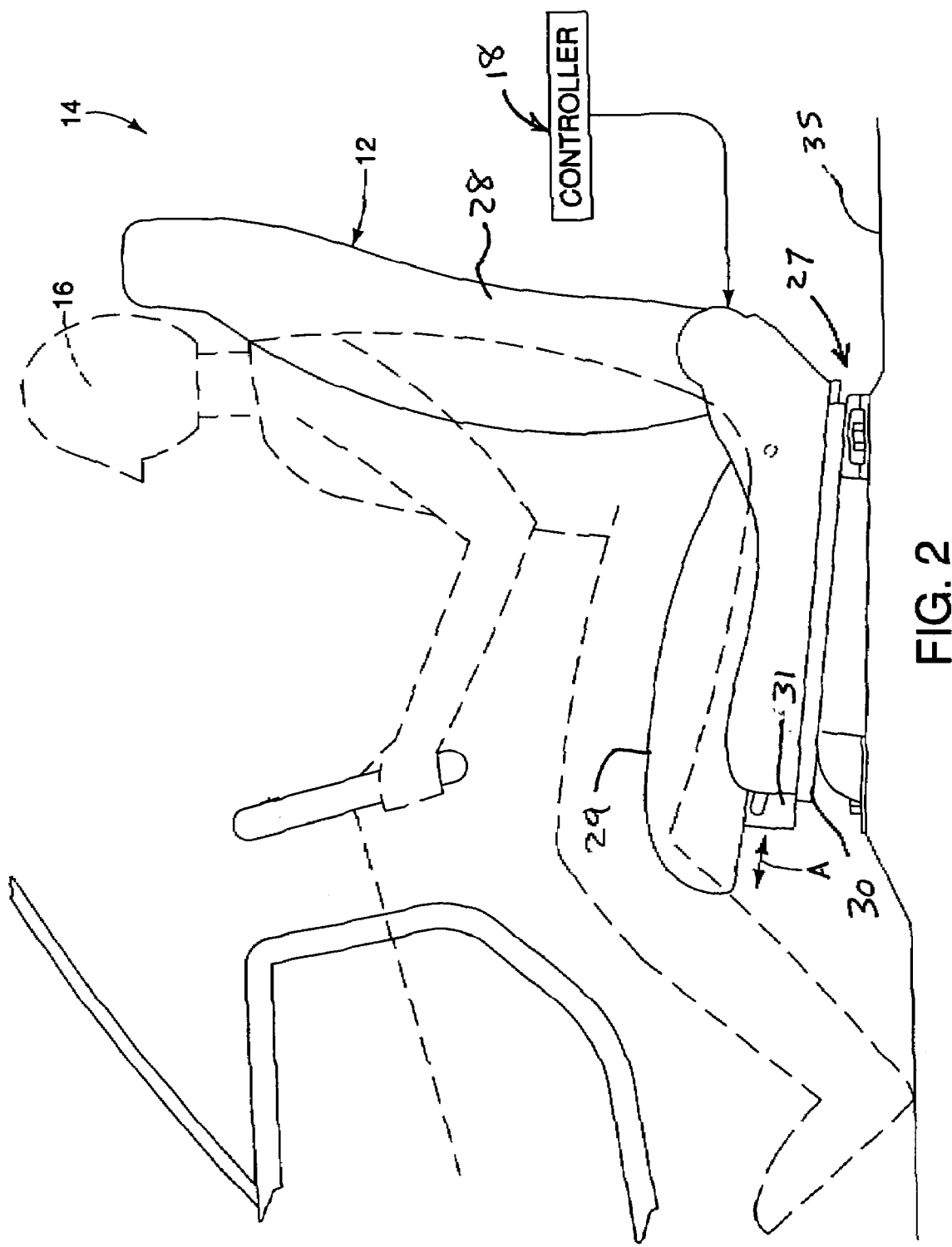
FIG. 2 is a schematic elevational side view of a portion of an interior of the vehicle illustrated in FIG. 1, showing the driver's side tiltable seat in accordance with the present invention with the seat in the normal position.
Figure 3:
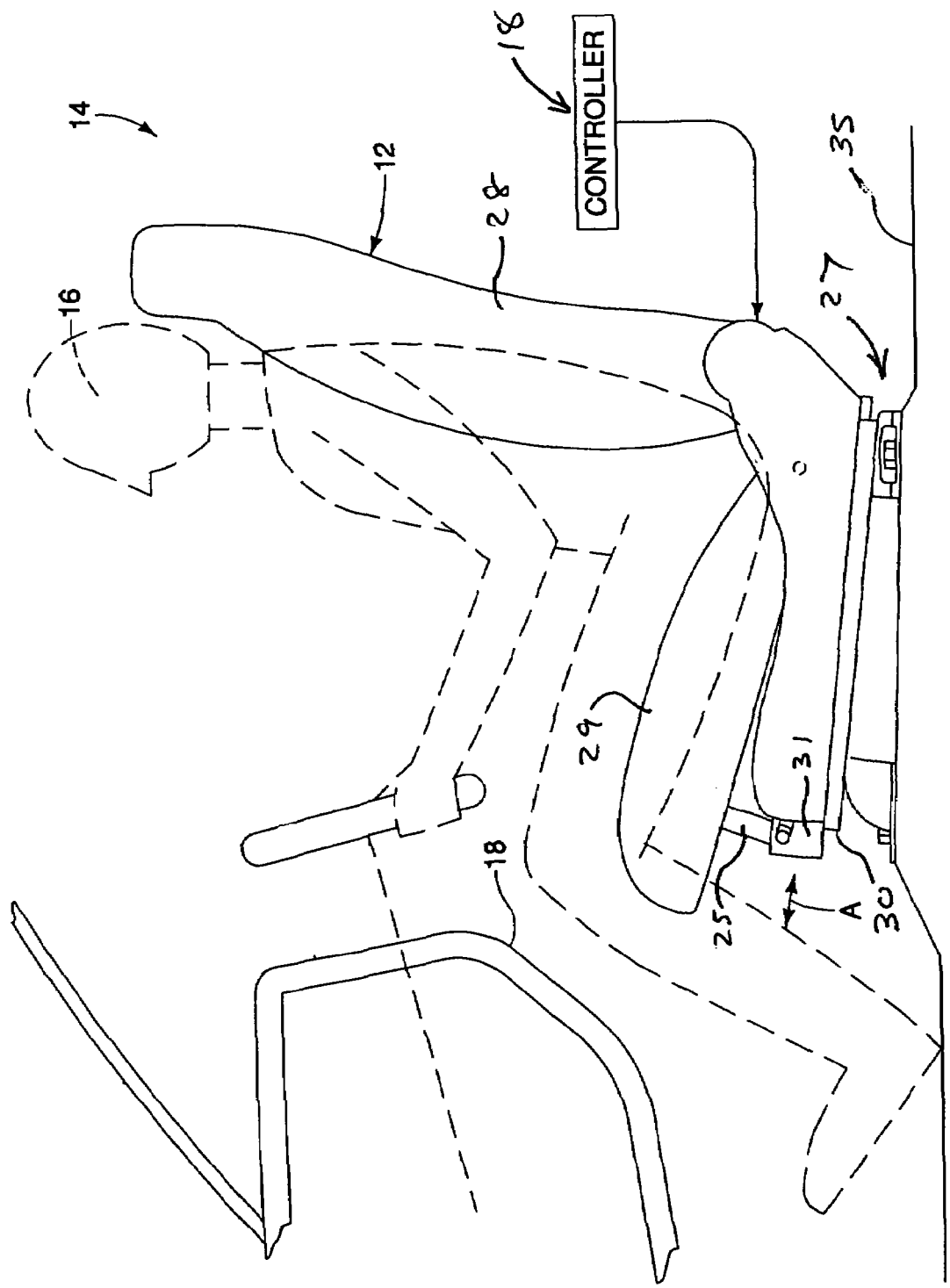
FIG. 3 is a schematic elevational side view of a portion of an interior of the vehicle illustrated in FIG. 1, showing the driver's side tiltable seat in accordance with the present invention with the seat in the tilted position.

Referring initially to FIGS. 1 to 3, a vehicle 10 is illustrated that includes a plurality of tiltable vehicle seats 12 located within a passenger compartment 14 in accordance with a first embodiment of the present invention. Thus, the present invention is applied to both the front and rear seats of the vehicle 10. However, for the sake of brevity, only the driver's side seat will be discussed and illustrated herein. Thus, as more clearly shown in FIGS. 2 and 3, the tiltable seat 12 of the present invention is arranged and configured to provide added safety and comfort for an occupant 16 during rapid vehicle deceleration of the vehicle 10 by tilting the front end of the tiltable seat 12 upward in the event of detection of the vehicle 10 undergoing rapid deceleration. In particular, by tilting the seat, the occupant 16 is substantially prevented from sliding forward into contact with interior structures of the vehicle 10, e.g., in the case of the front seat, undesirable interactions with a knee bolster and/or a dashboard can be reduced.

Figure 6:
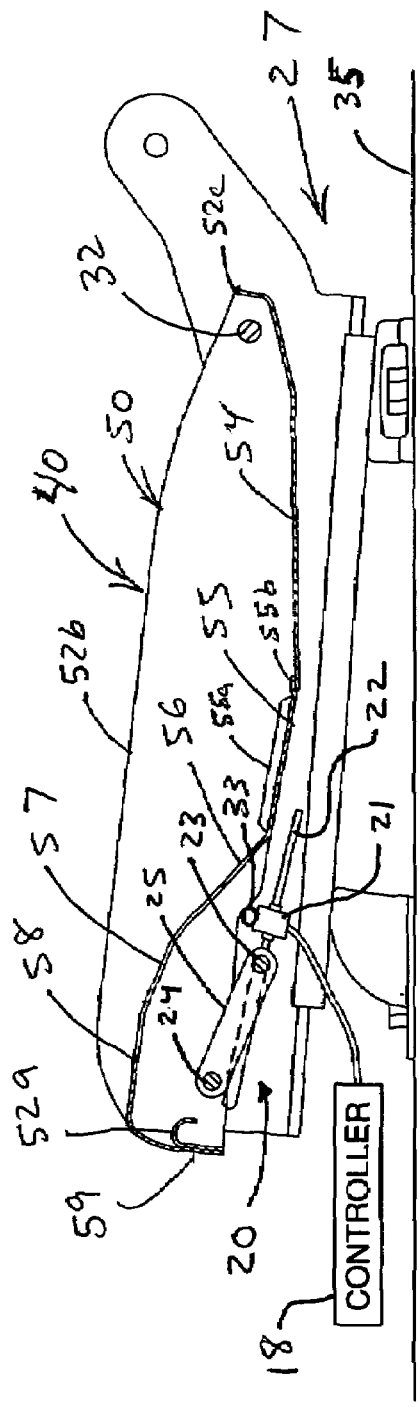
FIG. 6 is a simplified diagram of the seat pan and other selected portions of the tiltable seat, with the seat pan in a normal seating position in accordance with the first embodiment of the present invention.
Figure 7:
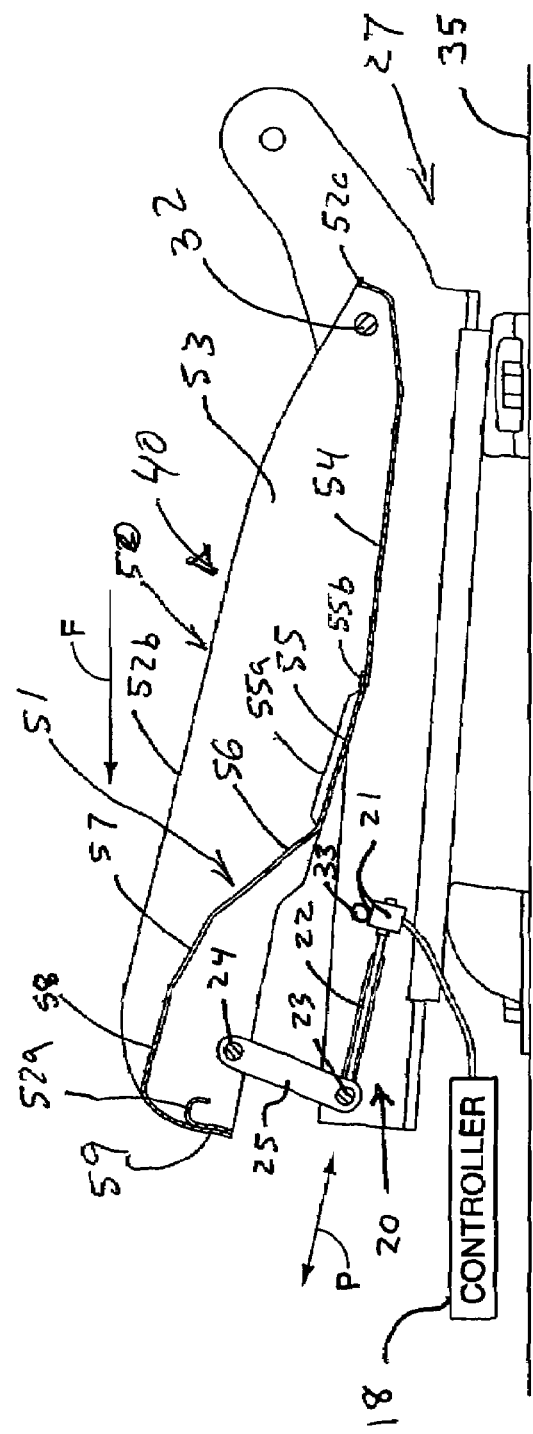
FIG. 7 is another simplified diagram, similar to FIG. 6, of the seat pan and other selected portions of the tiltable seat, with the seat pan in a deployed or tilted position in response to rapid vehicle deceleration.
Figure 8:
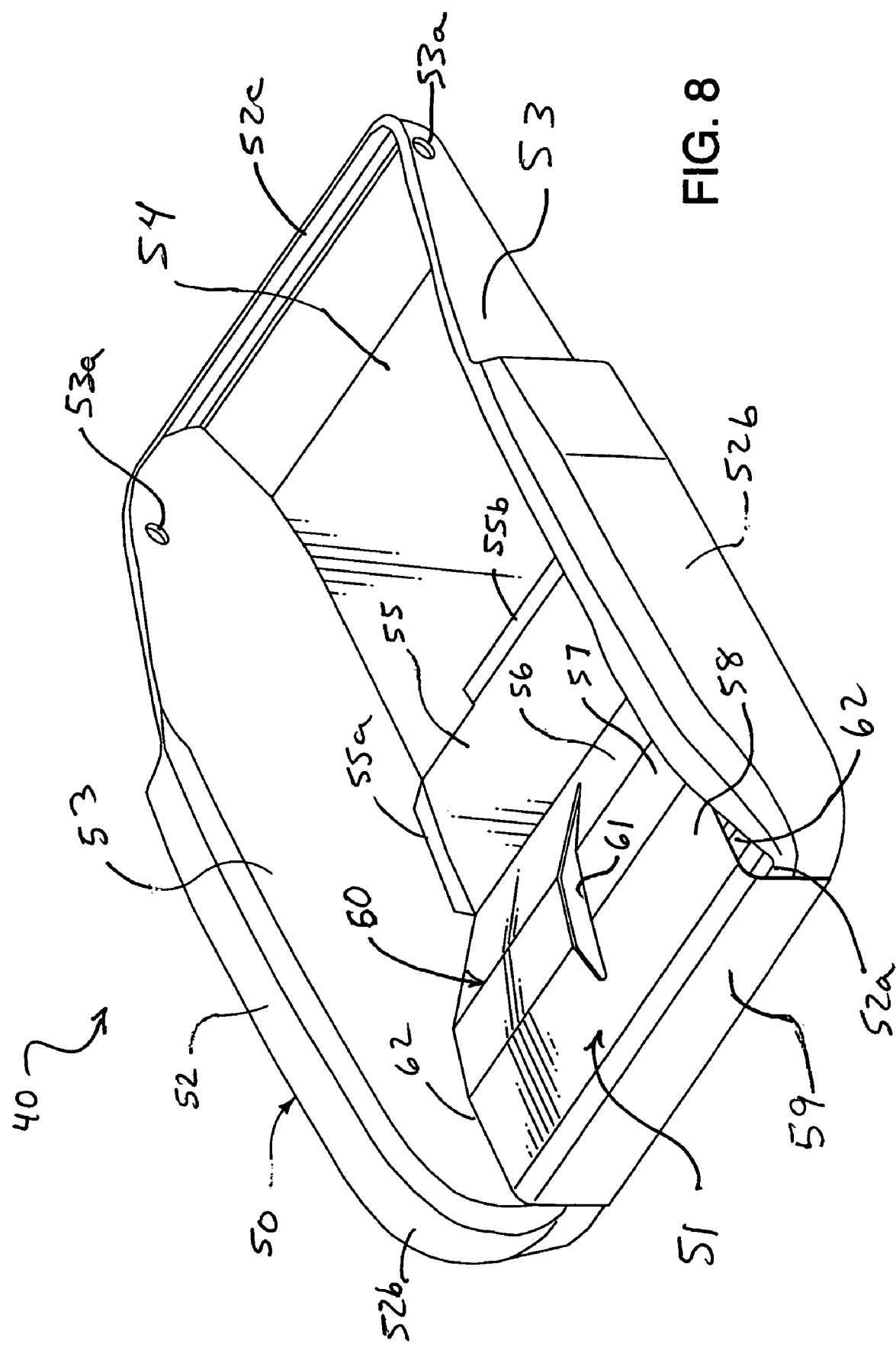
FIG. 8 is an upper side perspective view of the seat pan shown completely removed from the tiltable seat in accordance with the first embodiment of the present invention.
Figure 9:
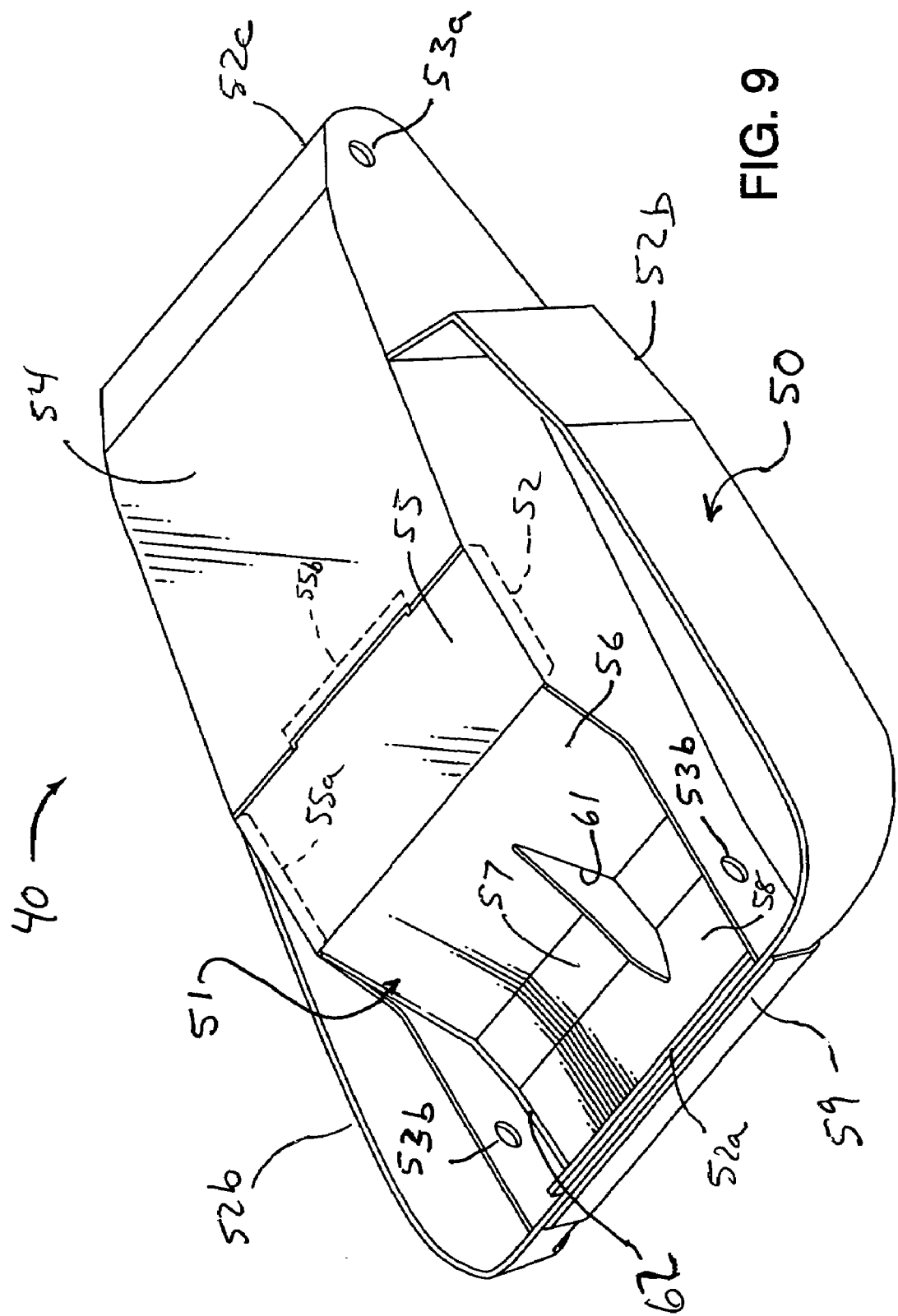
FIG. 9 is a lower side perspective view of the underside of the seat pan in accordance with the first embodiment of the present invention.
Figure 10:
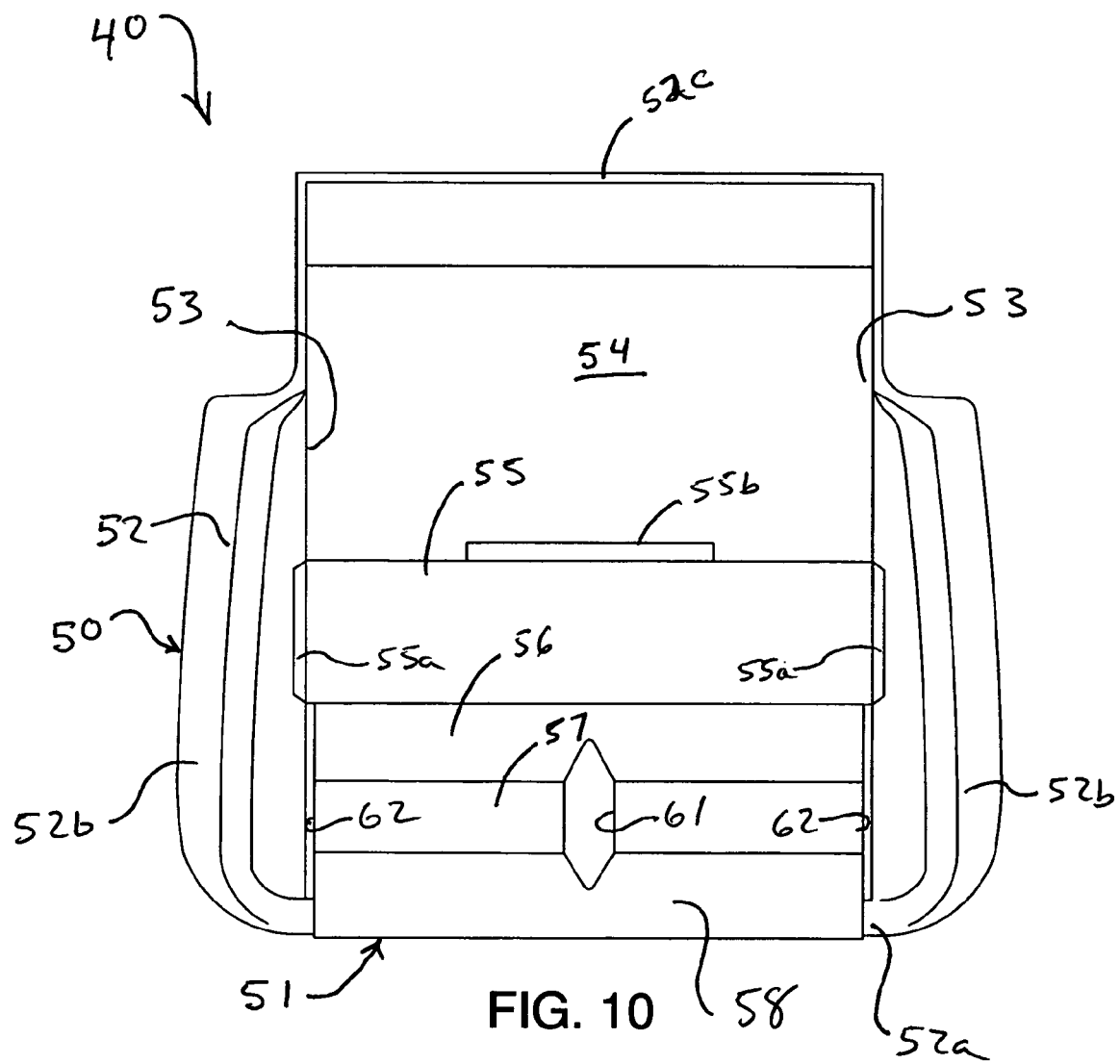
FIG. 10 is a top plan view of the seat pan in accordance with the first embodiment of the present invention.
Figure 11:
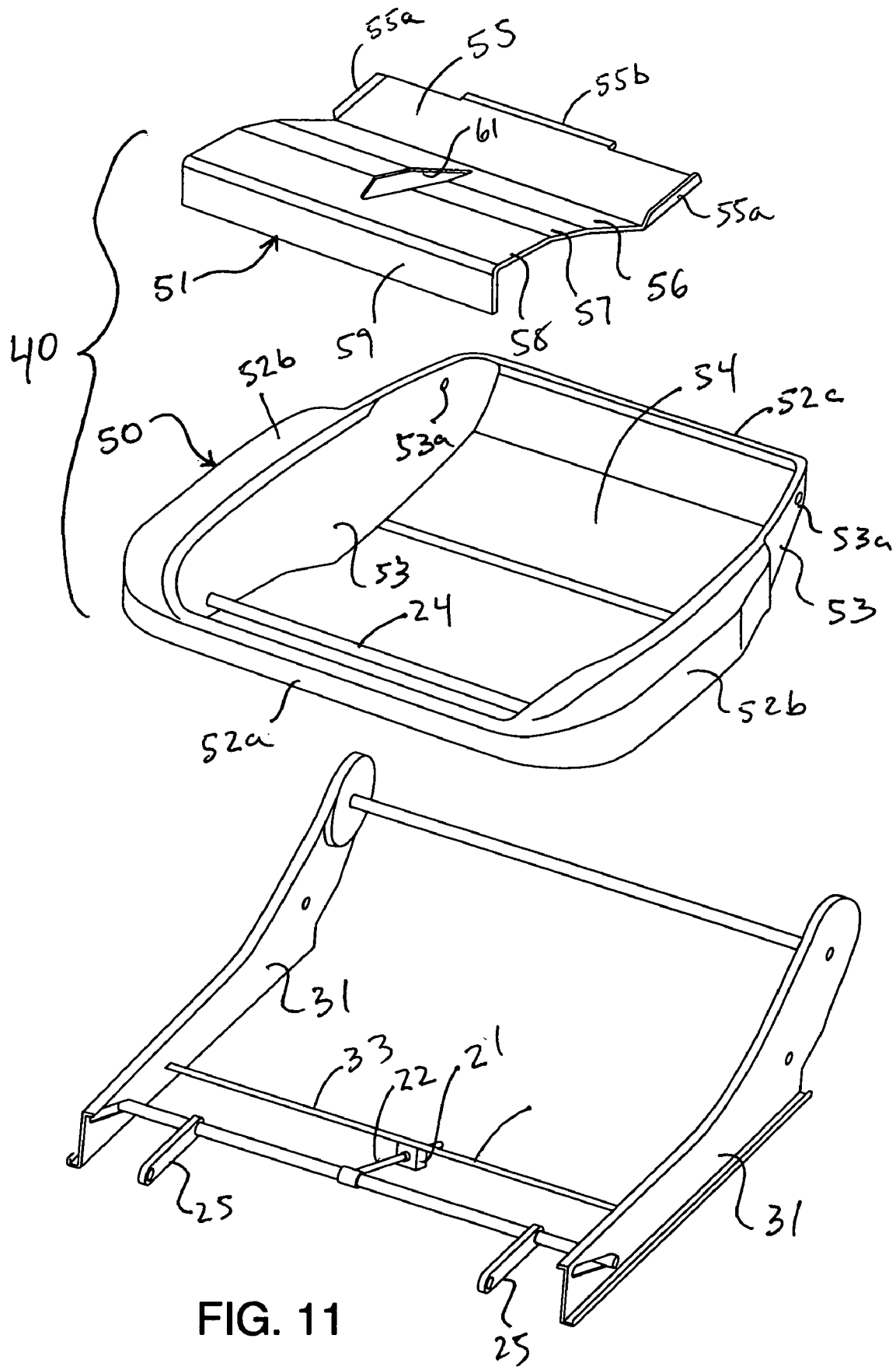
FIG. 11 is an exploded perspective view of the seat pan in accordance with the first embodiment of the present invention.
Figure 12:
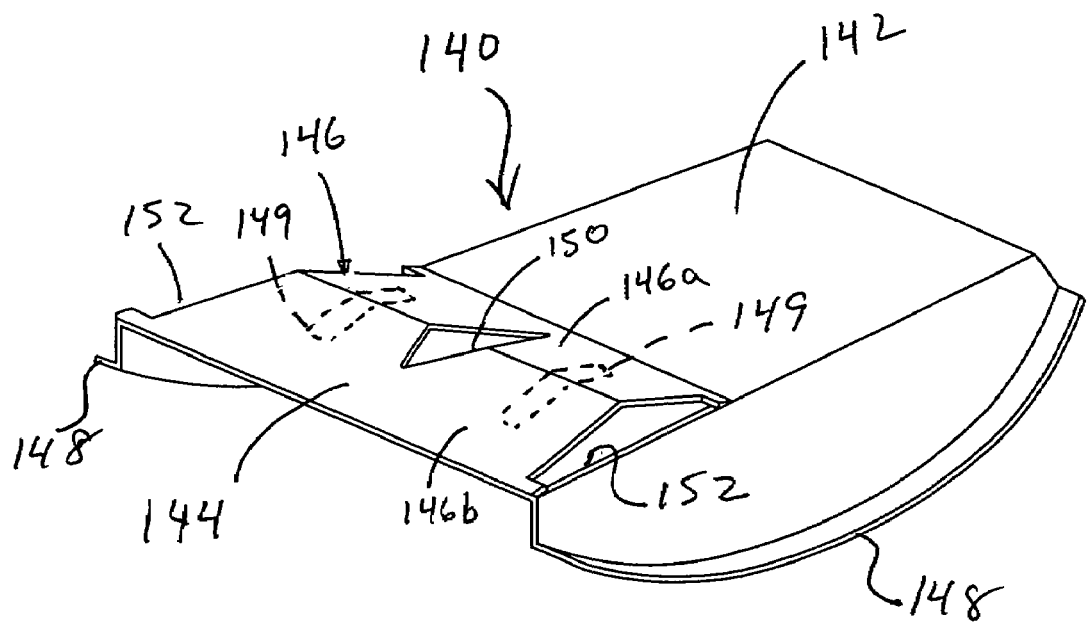
FIG. 12 is an upper side perspective view of a seat pan for a counter balanced motion seat in accordance with a second embodiment of the present invention.
Figure 13:
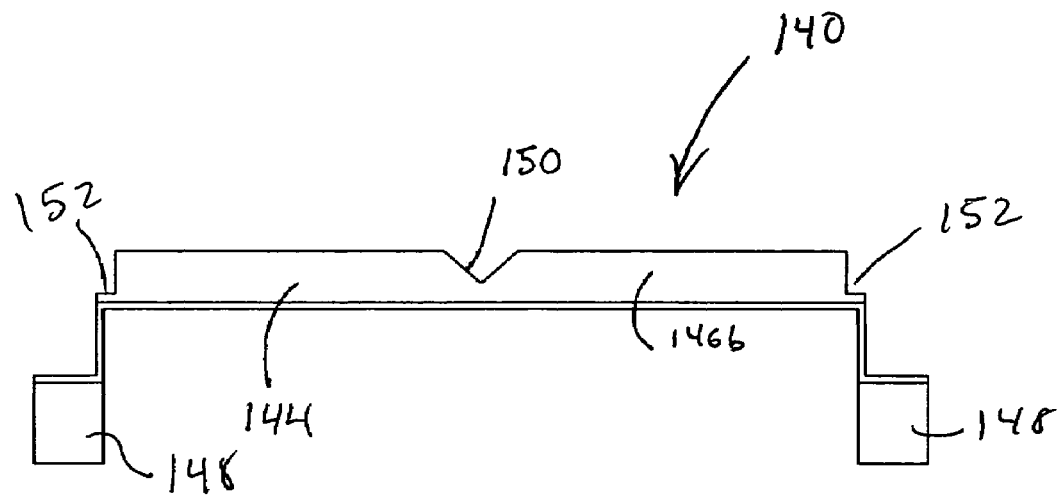
FIG. 13 is a front end elevational view of the seat pan in accordance with the second embodiment of the present invention.

As seen in FIGS. 6 and 7, tilting of the tiltable seat 12 is preferably controlled by a controller 18 that operates a seat pan tilting mechanism 20. The controller 18 preferably includes a microcomputer with a seat tilting control program that controls the tilting of the tiltable seat 12 in response to detection of a rapid deceleration condition existing in the vehicle 10. The controller 18 can be configured to tilt the tiltable seat 12 in preparation of a potential rapid deceleration (e.g. prior to a frontal impact) or during the occurrence of the rapid deceleration. Thus, the controller 18 is operatively connected to one or more sensors that are capable of detecting a vehicle condition that is indicative of a rapid deceleration condition existing in the vehicle 10. The controller 18 can also include other conventional components such as an input interface circuit, an output interface circuit, and storage devices such as a ROM (Read Only Memory) device and a RAM (Random Access Memory) device. The controller 18 can be part of other safety systems such as airbags. It will be apparent to those skilled in the art from this disclosure that the precise structure and algorithms for the controller 18 can be any combination of hardware and software that will carry out the functions of the present invention.

The seat pan tilting mechanism 20 of the tiltable seat 12 is illustrated as a motorized tilting mechanism in this first embodiment. However, it will be apparent to those skilled in the art from this disclosure that other types of tilting mechanisms can be used to carry out the present invention. For example, a spring loaded arrangement can be used to deploy the tiltable seat 12 as needed and/or desired. In the first illustrated embodiment, the seat pan tilting mechanism 20 includes an electric motor 21 with an extendable/retractable shaft 22, a movable control rod 23 operatively connected to the extendable/retractable shaft 22, a seat pan supporting rod 24 and a pair of connecting links 25 interconnecting the movable control rod 23 and the seat pan supporting rod 24 together. Basically, the electric motor 21 is operated by the controller 18 in response to detection of a rapid deceleration condition existing in the vehicle 10. Operation of the electric motor 21 to extend the shaft 22 in a forward direction of the vehicle 10 moves the movable control rod 23 forward, which in turn causes the links 25 to push the seat pan supporting rod 24 upward to tilt the front portion of the tiltable seat 12 as seen in FIG. 3.

Figure 4:
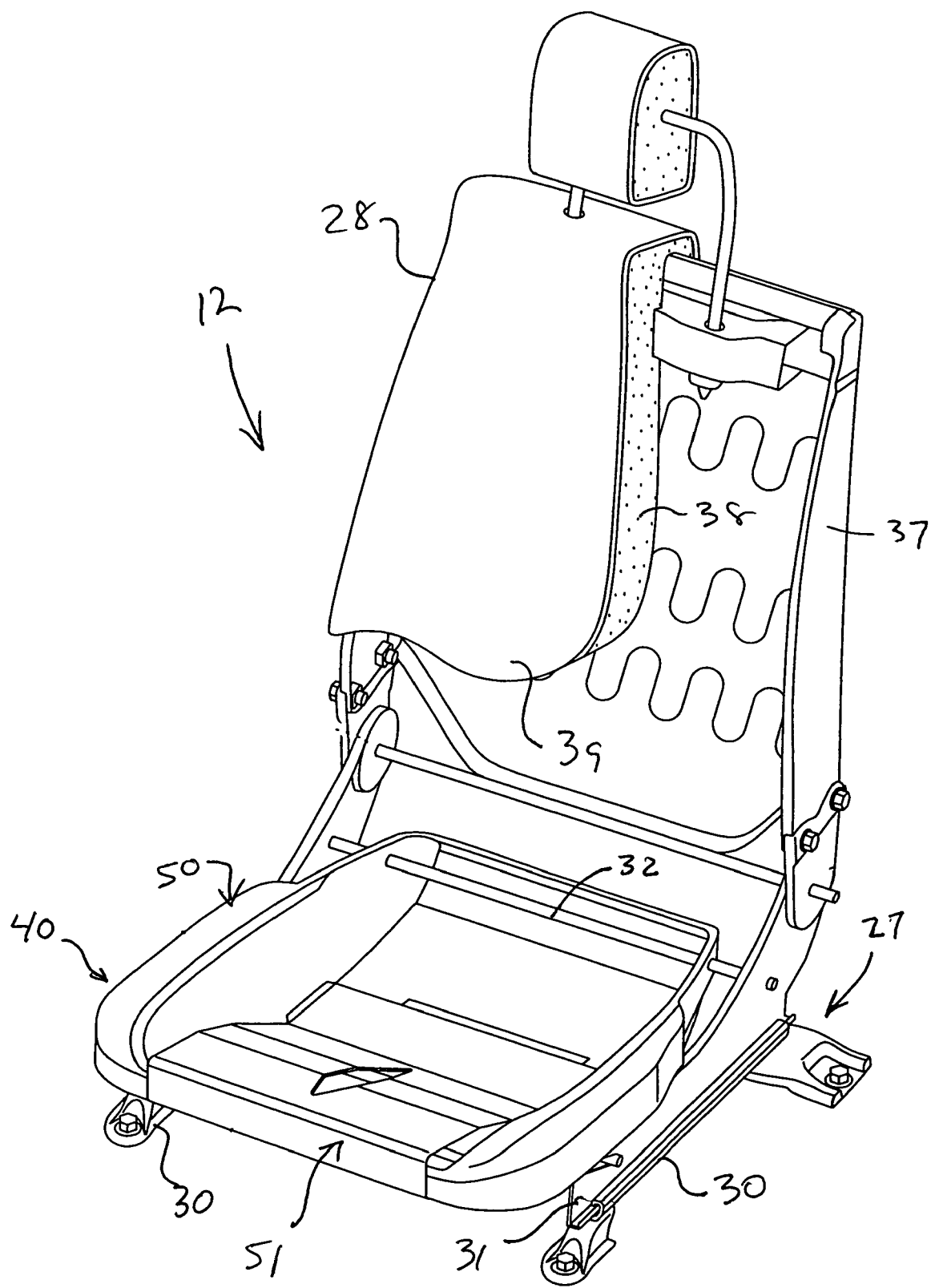
FIG. 4 is a simplified perspective view of the tiltable seat with upholstery and cushioning materials removed to reveal frame work of the tiltable seat, including a seat pan in accordance with a first embodiment of the present invention.
Figure 5:
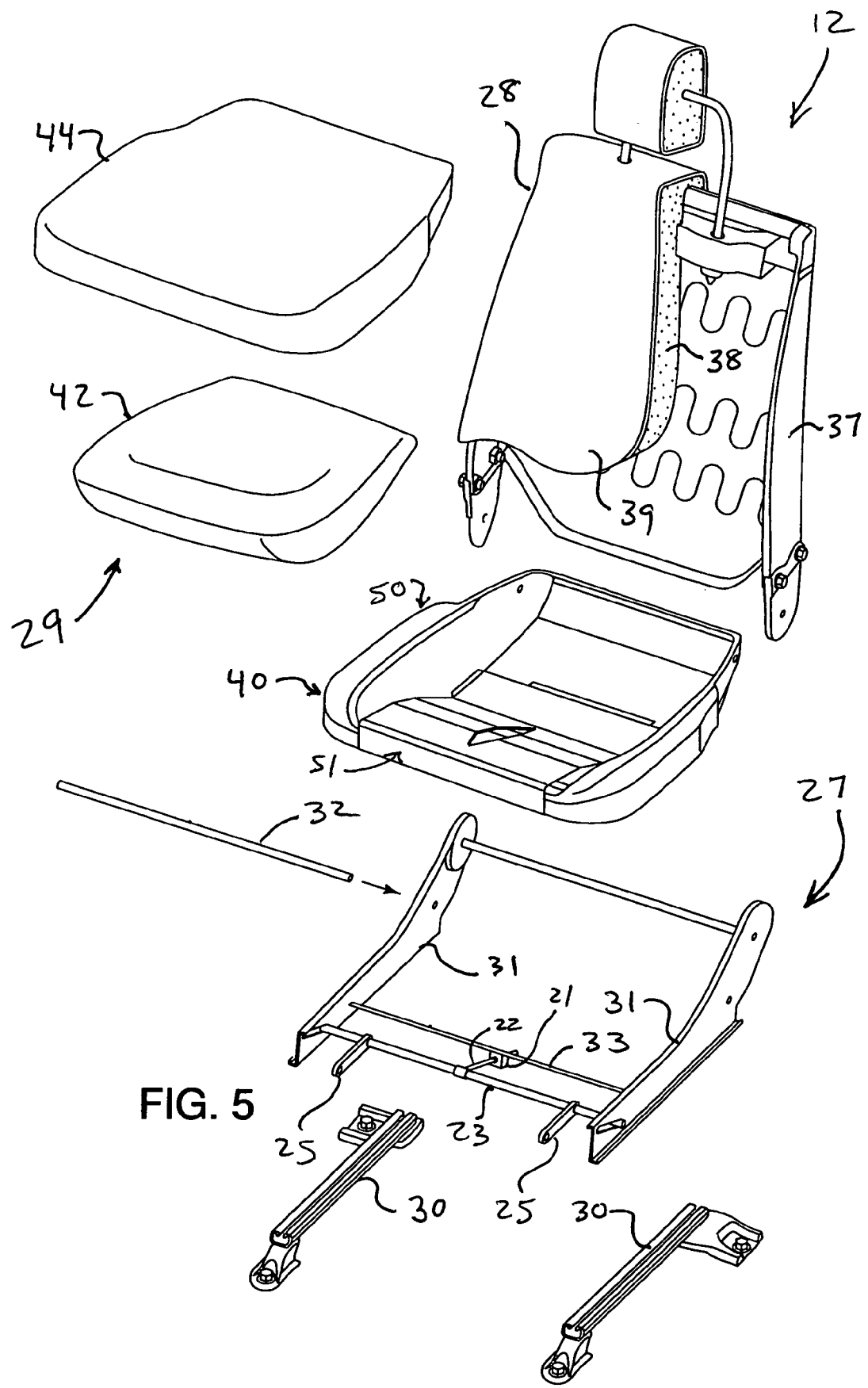
FIG. 5 is an exploded perspective view showing the various portions of the tiltable seat with the seat pan in accordance with the first embodiment of the present invention.

As seen in FIGS. 4 to 7, the tiltable seat 12 will now be described in greater detail. The tiltable seat 12 basically includes a seat mounting structure 27, a seat back 28 and a seat cushion 29. The seat back 28 and the seat cushion 29 form an occupant seating structure of the tiltable seat 12. The seat mounting structure 27 basically includes a pair of stationary mounting rails or tracks 30, a pair of sliding rails 31, a rear connecting rod 32 and a front connecting rod 33. Thus, the tiltable seat 12 is fixedly mounted to a vehicle floor 35 by the stationary mounting tracks 30 and the sliding rails 31. The stationary mounting tracks 30 and the sliding rails 31 form a seat mounting structure of the tiltable seat 12. The stationary mounting tracks 30 and the sliding rails 31 are configured and arranged to adjustably secure the tiltable seat 12 to the vehicle floor 35 for movement in the longitudinal direction of the vehicle 10 in a conventional manner. The stationary mounting tracks 30 are configured to be bolted or otherwise fixed to the vehicle floor 35 in a generally parallel arrangement, as indicated in FIGS. 4 and 5. Basically, the sliding rails 31 are fit into and engage the stationary mounting tracks 30 such that the sliding rails 31 can move forward and backward in a conventional manner relative to the stationary mounting tracks 30, as indicated by the arrow A in FIG. 2. For instance, a release lever (not shown) at the front of the tiltable seat 12 can be operated to release a locking mechanism (not shown) that allows for selective movement of the sliding rails 31 (and the tiltable seat 12) along the stationary mounting tracks 30 in a conventional manner.

The seat back 28 is relatively conventional in the present invention and basically includes a seat back frame 37 that is covered by a cushioning material 38 and an outer skin 39. Any type of seat back arrangement can be used with the present invention so long as it does not interfere with the tilting of the seat cushion 29 in accordance with the present invention. Thus, the seat back 28 will not be discussed in greater detail herein.

Referring to FIG. 5, the seat cushion 29 basically includes a metallic seat pan 40 with a cushioning material 42 overlying the upper surface of the metallic seat pan 40 and an outer skin 44 covering the metallic seat pan 40 and the seat cushion 42. The outer skin 44 is attached to the bottom surface of the metallic seat pan 40 via hook and loop fasteners or other suitable attachment arrangements. Since the constructions of the cushioning material 42 and the outer skin 44 are not important to the present invention, the cushioning material 42 and the outer skin 44 will not be discussed in greater detail herein. Rather, the cushioning material 42 and the outer skin 44 can be constructed as needed and/or desired.

In this first embodiment, as best seen in FIGS. 8-11, the metallic seat pan 40 is basically formed of two-pieces. In particular, the metallic seat pan 40 includes a main pan structure 50 and an insert structure 51 that is fixed to the main pan structure 50. The main pan structure 50 is preferably formed from a single sheet of metallic material that is stamped into the desired shape. Similarly, the insert structure 51 is preferably formed from a single sheet of metallic material that is stamped into the desired shape. Of course, it will be apparent to those skilled in the art from this disclosure that the metallic seat pan 40 can be a monolithic structure that is formed from a single sheet of metallic material. Likewise, it will be apparent to those skilled in the art from this disclosure that the metallic seat pan 40 can be more than two-pieces, as needed and/or desired.

The main pan structure 50 basically includes an annular rim 52, a pair of side walls 53 and a bottom wall 54. The particular overall shape of the main pan structure 50 will vary depending upon various design configurations. Thus, it will be apparent to those skilled in the art from this disclosure that illustrated shape of the main pan structure 50 is merely one example and that other shapes are possible. The annular rim 52 has a front rim section 52a, a pair of side rim sections 52b and a rear rim section 52c. The side walls 53 extend generally vertically between the side rim sections 52b and the bottom wall 54. Each of the side walls 53 has a rear pivot hole 53a and a front support hole 53b. The rear pivot holes 53a are axially aligned and receive the rear connecting rod 32 therein. The front support holes 53b are axially aligned and receive the front connecting rod 33 therein. Thus, the metallic seat pan 40 is pivotally mounted on the rear connecting rod 32 for movement between a normal seating position and a deployed or tilted seating position in response to movement of the seat pan supporting rod 24. The bottom wall 54 is generally concave plate that interconnects the side walls 53 and the rear rim section 52c of the annular rim 52. The insert structure 51 is fixedly coupled to the bottom wall 54, the side walls 53 and the rear rim section 52c of the annular rim 52. The insert structure 51 and the bottom wall 54 form a center occupant support structure of the metallic seat pan 40.

As best seen in FIGS. 5 to 10, the insert structure 51 basically includes a rear attachment section 55, a first generally planar section 56, a second generally planar section 57, a third generally planar section 58 and a front attachment section 59. Upon fixing the insert structure 51 to the main pan structure 50, a rearward part (the rear attachment section 55, and at least part of the first generally planar section 56) of the insert structure 51 and the bottom wall 54 form a rear buttocks supporting portion with a generally concave occupant facing surface, while a forward part (at least part of the first generally planar section 56 and the second and third generally planar sections 57 and 58) of the insert structure 51 forms a front femoral supporting portion. The forward portion of the first generally planar section 56 and the second and third generally planar sections 57 and 58 define a deformable anti-submarining beam extending laterally across the front femoral supporting portion. The deformable anti-submarining beam 60 is configured and arranged relative to the rear buttocks supporting portion to restrict movement of an occupant's buttocks in a longitudinal direction of the metallic seat pan 40 from the rear buttocks supporting portion towards the front femoral supporting portion. In particular, the deformable anti-submarining beam 60 has a prescribed rigidity that resists deformation during normal use of the tiltable seat 12. The prescribed rigidity of the deformable anti-submarining beam 60 is set to a prescribed deformation limit that reduces spinal compression of the occupant 16 by the deformable anti-submarining beam 60 deforming when the occupant's buttocks applies a deformation force in the longitudinal direction against the deformable anti-submarining beam 60 that exceeds the prescribed deformation limit. The deformable anti-submarining beam 60 is preferably configured and arranged to limit a peak compressive load to a lumbar region of the occupant 16 in the tiltable seat 12 to below 10 kN upon impact at vehicular speeds below 35 mph, and more preferably below 6 kN. In other words, the deformable anti-submarining beam 60 is designed to resists deformation until the occupant's buttocks applies a deformation force to the deformable anti-submarining beam 60 that would result a peak compressive load of 10 kN in the lumbar of the occupant 16 being exceeded upon impact at vehicular speeds below 35 mph. More preferably, the deformable anti-submarining beam 60 is designed to resists deformation until the occupant's buttocks applies a deformation force to the deformable anti-submarining beam 60 that would result a peak compressive load of 6 kN in the lumbar of the occupant 16 being exceeded upon impact at vehicular speeds below 35 mph.

Since the center occupant support structure of the metallic seat pan 40 is formed of two pieces of sheet material such that the deformable anti-submarining beam 60 of the metallic seat pan 40 is formed from a different material from the main pan structure 50, the deformable anti-submarining beam 60 can be easily constructed with a rigidity that is different from the rigidities of the rest of the metallic seat pan 40. The rigidity of the deformable anti-submarining beam 60 can be more precisely set using cut-outs and/or reinforcements to obtain the desired rigidity. In this first embodiment, the deformable anti-submarining beam 60 is formed from a single sheet of metallic material that is welded to the main pan structure 50. The thickness and material of the insert structure 51 can be the same or different from the main pan structure 50 in order to obtain the desired (prescribed) rigidity in the deformable anti-submarining beam 60 that resists deformation during normal use of the tiltable seat 12 and has the desired (prescribed) deformation limit to protect the spine of the occupant 16 when the metallic seat pan 40 is tilted to the deployed position as seen in FIGS. 3 and 7.

The deformable anti-submarining beam 60 is preferably provided with a centrally located cut-out 61 and a pair of lateral side cut-outs 62 that facilitate deformation of the deformable anti-submarining beam 60 in order to obtain the desired (prescribed) rigidity in the deformable anti-submarining beam 60 to protect the spine of the occupant 16 when the metallic seat pan 40 is tilted to the deployed position as seen in FIGS. 3 and 7. In other words, cut-outs and materials are used to optimize the deformation characteristics of the deformable anti-submarining beam 60 in this embodiment. The lateral side cut-outs 62 are formed by the lateral edges of the insert structure 51 being spaced from the side walls 53 along the deformable anti-submarining beam 60 in this embodiment. Thus, the cut-outs 61 and 62 are included in the deformable anti-submarining beam 60 of the seat pan 40 to facilitate a predetermined deformation of the deformable anti-submarining beam 60 in response to rapid acceleration of the occupant 16 seated in the tiltable seat 12 relative to the floor 35. Specifically, at least the first and second generally planar sections 56 and 57 are deformable in response to a prescribed deformation force F exerted from general direction of buttocks supporting end of the seat pan 40 with the seat pan 40 in the deployed position depicted in FIG. 7.

The rear attachment section 55 of the insert structure 51 has two side gussets 55a that are fixed to the side walls 53, respectively, and a center gusset 55b that is fixed to the bottom wall 54. The lateral edges of the generally planar sections 56, 57 and 58 are spaced from the side walls 53 to form the lateral side cut-outs 62. The first generally planar section 56 of the insert structure 51 has a generally planar upper surface that is arranged such that the generally planar sections 56, 57 and 58 together form a convex surface with each of the generally planar sections 56, 57 and 58 being angularly offset from one another. The generally planar sections 56 and 57 angularly offset by an angle in the range of 10-45 degrees, depending upon the design parameters of the vehicle 10 and the comfort desired from the tiltable seat 12. The lateral side edges of the first generally planar section 56 of the insert structure 51 can be provided with gussets that are fixed to the side walls 53 as needed and/or desired to obtain the desired (prescribed) rigidity in the deformable anti-submarining beam 60.

In the above described embodiment, the seat pan 40 is preferably formed from a plurality of portions made of low carbon steel that are welded or otherwise joined together to make a solid single assembly. However it should be understood from the drawings and the description that the seat pan 40 can be manufactured with fewer integrated elements, or as in a second embodiment described below, can be made as a single unitary member.

Referring now to FIGS. 12-15, a metallic seat pan 140 is illustrated in accordance with another embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Basically, the present invention is incorporated into a counter balanced motion seat (hereinafter "CBM seat") such the CBM seats disclosed in U.S. Pat. Nos. 4,650,249; 5,244,252; 5,460,427; 5,558,399 and 5,735,574 and U.S. Patent Publication No. 2005/0242634. Since CBM seats are well known, the details of the CBM seat will not be describe or illustrated in detail herein.

Basically, the metallic seat pan 140 includes a rear buttocks supporting portion 142, and a front femoral supporting portion 144 with a deformable anti-submarining beam 146 extending laterally across the front femoral supporting portion 144. The metallic seat pan 140 also includes a pair of curved tilting rails 148. The curved tilting rails 148 are arranged and configured to provide pivoting movement of the metallic seat pan 140 from a seating position shown in FIG. 14 to a deployed position shown in FIG. 15 in response to rapid forward acceleration of the occupant in the CBM seat relative to the floor. For simplicity, FIGS. 14 and 15 are schematic drawings with portions of the CBM seat removed.

The metallic seat pan 140 is a monolithic structure. In other words, the rear buttocks supporting portion 142, the front femoral supporting portion 144 with the deformable anti-submarining beam 146 and the curved tilting (counter balanced motion) rails 148 are all integrally as a one-piece, unitary member from a single sheet of metallic material. In this embodiment, the rear buttocks supporting portion 142 is shown as flat planar surface. However, it will be apparent to those skilled in the art from this disclosure that the rear buttocks supporting portion 142 can have a concave occupant facing surface as needed and/or desired. The deformable anti-submarining beam 146, in this embodiment, is formed by first generally planar section 146a and a second generally planar section 146b.

However, it will be apparent to those skilled in the art from this disclosure that the deformable anti-submarining beam 146 can have other configurations as needed and/or desired so long as the deformable anti-submarining beam 146 restricts movement of an occupant's buttocks in a longitudinal direction of the metallic seat pan 140. As in the prior embodiment, the deformable anti-submarining beam 146 has a prescribed rigidity that resists deformation during normal use of the CBM seat. In other words, the prescribed rigidity of the deformable anti-submarining beam 146 is set to a prescribed deformation limit that reduces spinal compression of the occupant by the deformable anti-submarining beam 146 deforming when the occupant's buttocks applies a deformation force in the longitudinal direction against the deformable anti-submarining beam 146 that exceeds the prescribed deformation limit. In other words, the deformable anti-submarining beam 146 is designed to resists deformation until the occupant's buttocks applies a deformation force F to the deformable anti-submarining beam 146 that would result a peak compressive load of 10 kN in the lumbar of the occupant being exceeded upon impact at vehicular speeds below 35 mph. More preferably, the deformable anti-submarining beam 146 is designed to resists deformation until the occupant's buttocks applies a deformation force to the deformable anti-submarining beam 146 that would result a peak compressive load of 6 kN in the lumbar of the occupant being exceeded upon impact at vehicular speeds below 35 mph.

The deformable anti-submarining beam 146 is preferably provided with a centrally located cut-out 150 and a pair of lateral side cut-outs 152 that facilitate deformation of the deformable anti-submarining beam 146 in order to obtain the desired (prescribed) rigidity in the deformable anti-submarining beam 146 to protect the spine of the occupant when the metallic seat pan 140 is tilted to the deployed position as seen in FIG. 15. Also two reinforcements 149 are attached to the underside of the deformable anti-submarining beam 146 are selected locations to obtain the prescribed rigidity with the prescribed deformation to protect the occupant's spine. In other words, cut-outs, reinforcements and materials are used to optimize the deformation characteristics of the deformable anti-submarining beam 146 in this embodiment.

The seating position of the metallic seat pan 140 in FIG. 14 corresponds to a normal driving or operational orientation of the CBM seat. The deployed position shown in FIG. 15 is achieved in response to sudden acceleration of the CBM seat with respect to the floor. For example, if the vehicle 10 is involved in a frontal accident and the vehicle 10 comes to a sudden stop, the CBM seat will experience rapid acceleration forces relative to the floor due to momentum and will be urged to move along an arcuate path to the forward or deployed position. The metallic seat pan 140 uses the seat pan tilting mechanism 20 of the first embodiment. Thus, as described above, the seat pan tilting mechanism 20 normal holds the metallic seat pan 140 in the seating position shown in FIG. 14. The seat pan tilting mechanism 20 also controls movement of the metallic seat pan 140 such that the metallic seat pan 140 can move forward to the deployed position shown in FIG. 15 in response to rapid acceleration of the metallic seat pan 140 relative to the floor.

The CBM seat is mounted to the floor of the vehicle by a seat mounting structure 160 that is similar to the first embodiment. The seat mounting structure 160 basically includes a pair of stationary mounting rails or tracks 162 (only one shown) and a pair of sliding rails 164 (only one shown). Thus, the CBM seat is fixedly mounted to a vehicle floor by the stationary mounting tracks 162 and the sliding rails 164. The stationary mounting tracks 162 and the sliding rails 164 form a seat mounting structure of the CBM seat. The stationary mounting tracks 162 and the sliding rails 164 are configured and arranged to adjustably secure the CBM seat to the vehicle floor for movement in the longitudinal direction of the vehicle in a conventional manner. The stationary mounting tracks 162 are configured to be bolted or otherwise fixed to the vehicle floor in a generally parallel arrangement similar to the first embodiment. Basically, the sliding rails 164 are fit into and engage the stationary mounting tracks 162 such that the sliding rails 164 can move forward and backward in a conventional manner relative to the stationary mounting tracks 162. For instance, a release lever is provided at the front of the CBM seat for selective movement of the sliding rails 164 (and the CBM seat) along the stationary mounting tracks 162 in a conventional manner.

As shown in FIGS. 14 and 15, each of the sliding rails 164 has a plurality of rollers 166. The rollers 166 are rotatably supported on the sliding rails 164 at spaced apart locations by shafts (not shown). The rollers 166 engage the curved tilting rails 148 to slidably support the metallic seat pan 140 for tilting movement from the seating position shown in FIG. 14 to the deployed position shown in FIG. 15 in response to rapid acceleration of the metallic seat pan 140 relative to the floor.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with a tiltable seat in accordance with the present invention. Accordingly, these terms, as utilized to describe the present invention should be interpreted relative to a vehicle equipped with a tiltable seat in accordance with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A metallic seat pan comprising:
a rear buttocks supporting portion; and
a front femoral supporting portion including a deformable anti-submarining beam extending laterally across the front femoral supporting portion from a first lateral side of the front femoral supporting portion to a second lateral side of the front femoral supporting portion opposite the first lateral side,
the deformable anti-submarining beam being configured and arranged relative to the rear buttocks supporting portion to restrict movement of an occupant's buttocks in a longitudinal direction from the rear buttocks supporting portion towards the front femoral supporting portion,
the deformable anti-submarining beam having a prescribed rigidity that resists deformation, the prescribed rigidity being set to a prescribed deformation limit that reduces spinal compression of an occupant by deforming when the occupant's buttocks applies a deformation force in the longitudinal direction that exceeds the prescribed deformation limit, the deformable anti-submarining beam including at least one cut-out that facilitates deformation, the at least one cut-out being centered between and spaced apart from the first and second lateral sides of the front femoral supporting portion.

2. The metallic seat pan as set forth in claim 1, wherein the deformable anti-submarining beam has a generally convex occupant facing surface.

3. The metallic seat pan as set forth in claim 2, wherein the generally convex occupant facing surface of the deformable anti-submarining beam includes a first generally planar section and a second generally planar section.

4. The metallic seat pan as set forth in claim 1, wherein the deformable anti-submarining beam includes at least one reinforcement to obtain the prescribed rigidity.

5. The metallic seat pan as set forth in claim 1, further comprising
a pair of curved rails fixed relative to the rear buttocks supporting portion and the front femoral supporting portion, the curved rails extending in the longitudinal direction along respective ones of the first and second lateral sides of the front femoral supporting portion and first and second lateral sides of the rear femoral supporting portion.

6. The metallic seat pan as set forth in claim 5, wherein the curved rails, the rear buttocks supporting portion and the front femoral supporting portion are formed as a one-piece unitary structure from a single sheet of metallic material.

7. The metallic seat pan as set forth in claim 5, wherein the deformable anti-submarining beam has a generally convex occupant facing surface.

8. The metallic seat pan as set forth in claim 5, wherein the deformable anti-submarining beam includes at least one reinforcement to obtain the prescribed rigidity.

9. The metallic seat pan as set forth in claim 5, further comprising
the at least one cut-out further includes a first side cutout and a second side cut out, the first side cut out being located between the first lateral side of the front femoral supporting portion and a first one of the pair of curved rails, the second side cutout being located between the second lateral side of the front femoral supporting portion and a second one of the pair of curved rails.

10. A tiltable vehicle seat comprising:
a stationary seat mounting structure;
an occupant seating structure attached to the stationary seat mounting structure, the occupant seating structure including a metallic seat pan having
a rear buttocks supporting portion, and
a front femoral supporting portion including a deformable anti-submarining beam extending laterally across the front femoral supporting portion from a first lateral side of the front femoral supporting portion to a second lateral side of the front femoral supporting portion opposite the first lateral side,
the deformable anti-submarining beam being configured and arranged relative to the rear buttocks supporting portion to restrict movement of an occupant's buttocks in a longitudinal direction from the rear buttocks supporting portion towards the front femoral supporting portion,
the deformable anti-submarining beam having a prescribed rigidity that resists deformation, the prescribed rigidity being set to a prescribed deformation limit that reduces spinal compression of an occupant by deforming when the occupant's buttocks applies a deformation force in the longitudinal direction that exceeds the prescribed deformation limit, the deformable anti-submarining beam including at least one cut-out that facilitates deformation, the at least one cut-out being centered between and spaced apart from the first and second lateral sides of the front femoral supporting portion; and
a seat pan tilting mechanism configured and arranged to selectively tilt the front femoral supporting portion upwardly relative to the rear buttocks supporting portion.

11. The tiltable vehicle seat as set forth in claim 10, wherein the deformable anti-submarining beam has a generally convex occupant facing surface.

12. The tiltable vehicle seat as set forth in claim 11, wherein the generally convex occupant facing surface of the deformable anti-submarining beam includes a first generally planar section and a second generally planar section.

13. The tiltable vehicle seat as set forth in claim 10, wherein the deformable anti-submarining beam includes at least one reinforcement to obtain the prescribed rigidity.

14. The tiltable vehicle seat as set forth in claim 10, wherein the seat pan tilting mechanism includes a sliding arrangement coupled to the stationary seat mounting structure and a pair of curved rails fixed to the metallic seat pan and extending in the longitudinal direction of the metallic seat pan, with the curved rails engaging the sliding arrangement to selectively tilt the metallic seat pan relative to the stationary seat mounting structure.

15. The tiltable vehicle seat as set forth in claim 14, wherein the curved rails, the rear buttocks supporting portion and the front femoral supporting portion are formed as a one-piece unitary structure from the single sheet of metallic material.

16. The tiltable vehicle seat as set forth in claim 15, wherein the deformable anti-submarining beam has a generally convex occupant facing surface.

17. The tiltable vehicle seat as set forth in claim 14, wherein the at least one cut-out further includes a first side cutout and a second side cut out, the first side cut out being located between the first lateral side of the front femoral supporting portion and a first one of the pair of curved rails, the second side cutout being located between the second lateral side of the front femoral supporting portion and a second one of the pair of curved rails.

18. The tiltable vehicle seat as set forth in claim 10, further comprising
a pair of curved rails fixed relative to the rear buttocks supporting portion and the front femoral supporting portion, the curved rails extending in the longitudinal direction.

19. The tiltable vehicle seat as set forth in claim 18, wherein the deformable anti-submarining beam includes at least one reinforcement to obtain the prescribed rigidity.

20. A metallic seat pan comprising:
a rear buttocks supporting portion; and
a front femoral supporting portion formed with the rear buttocks supporting portion as a one-piece unitary structure from a single sheet of metallic material, at least one section of the front femoral supporting portion defining a deformable anti-submarining beam extending laterally across the front femoral supporting portion from a first lateral side of the front femoral supporting portion to a second lateral side of the front femoral supporting portion opposite the first lateral side, the deformable anti-submarining beam being configured and arranged relative to the rear buttocks supporting portion to restrict movement of an occupant's buttocks in a longitudinal direction from the rear buttocks supporting portion towards the front femoral supporting portion, the deformable anti-submarining beam having a prescribed rigidity that resists deformation, the prescribed rigidity being set to a prescribed deformation limit that reduces spinal compression of an occupant by deforming when the occupant's buttocks applies a deformation force in the longitudinal direction that exceeds the prescribed deformation limit, the deformable anti-submarining beam including at least one cut-out that facilitates deformation, the at least one cut-out being centered between and spaced apart from the first and second lateral sides of the front femoral supporting portion.

21. The metallic seat pan as set forth in claim 20, wherein the at least one cut-out further includes a first side cutout and a second side cut out, the first side cut out being located along the first lateral side of the front femoral supporting portion and the second side cutout being located along the second lateral side of the front femoral supporting portion.

* * * * *